E. MEITNER.
RANGE INDICATOR.
APPLICATION FILED JUNE 18, 1915.
1,368,224.
Patented Feb. 8, 1921.
4 SHEETS—SHEET 1.
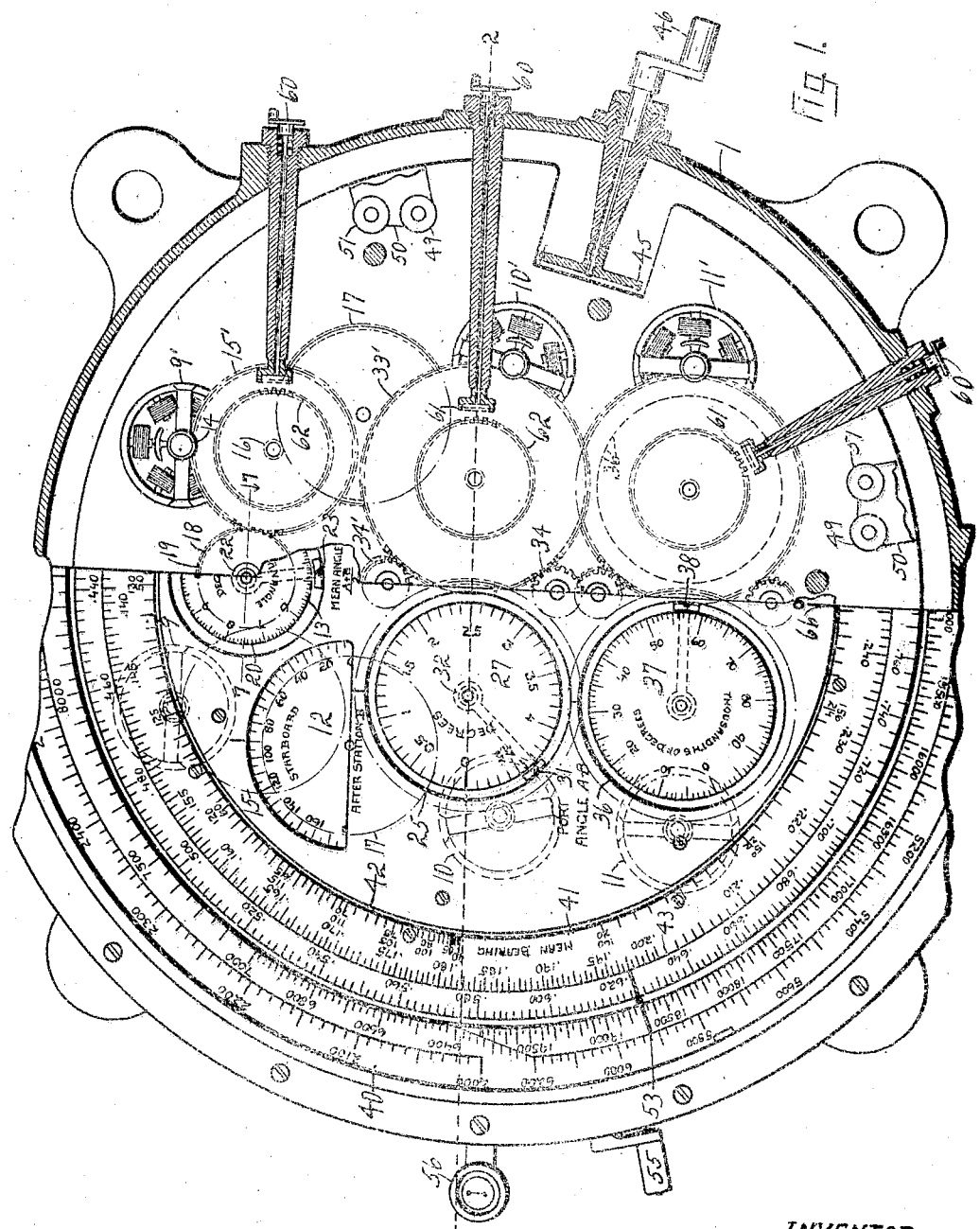
INVENTOR.
ELMER MEITNER
BY
Herbert H. Thompson
ATTORNEY.

E. MEITNER.
RANGE INDICATOR.
APPLICATION FILED JUNE 18, 1915.
1,368,224.
Patented Feb. 8, 1921
4 SHEETS—SHEET 2.
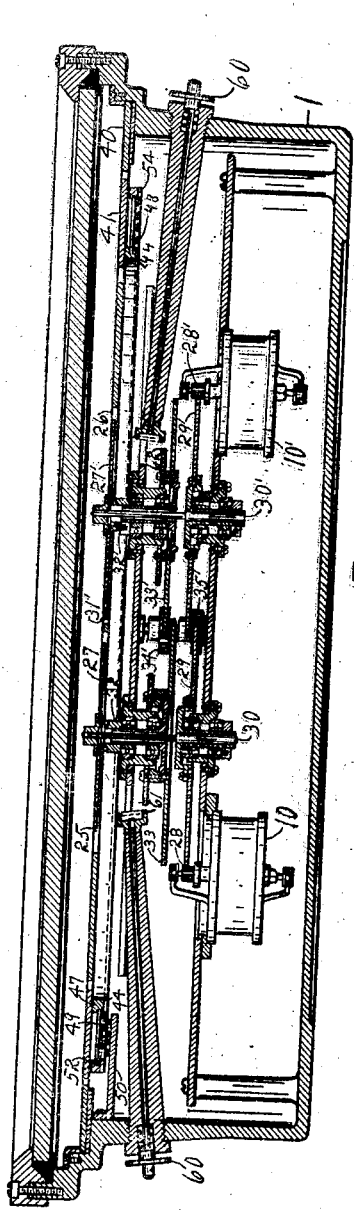
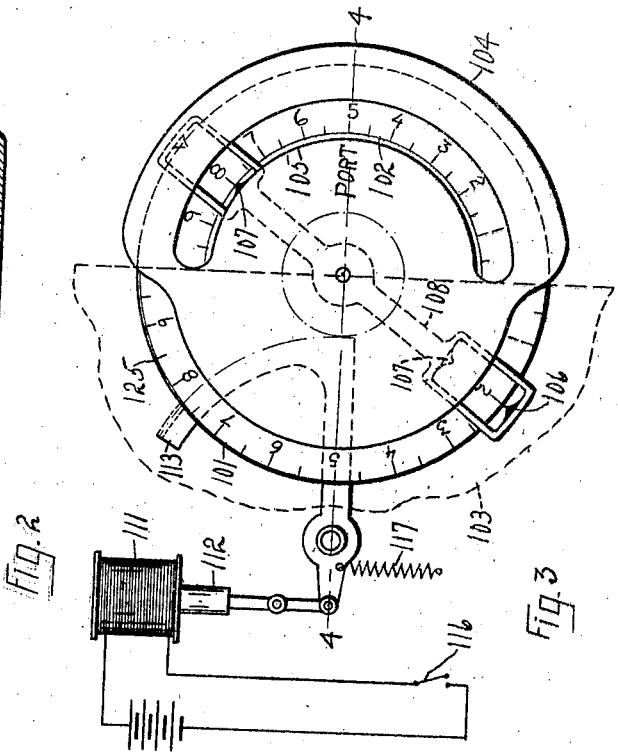
INVENTOR.
ELEMER MEITNER
BY Herbert H. Thompson
ATTORNEY

E. MEITNER.
RANGE INDICATOR.
APPLICATION FILED JUNE 18, 1915.

1,368,224.

Patented Feb. 8, 1921.
4 SHEETS—SHEET 3.

INVENTOR.
ELEMER MEITNER
BY Herbert H. Thompson
ATTORNEY.

E. MEITNER.
RANGE INDICATOR.
APPLICATION FILED JUNE 18, 1915.
1,368,224.
Patented Feb. 8, 1921.
4 SHEETS—SHEET 4.
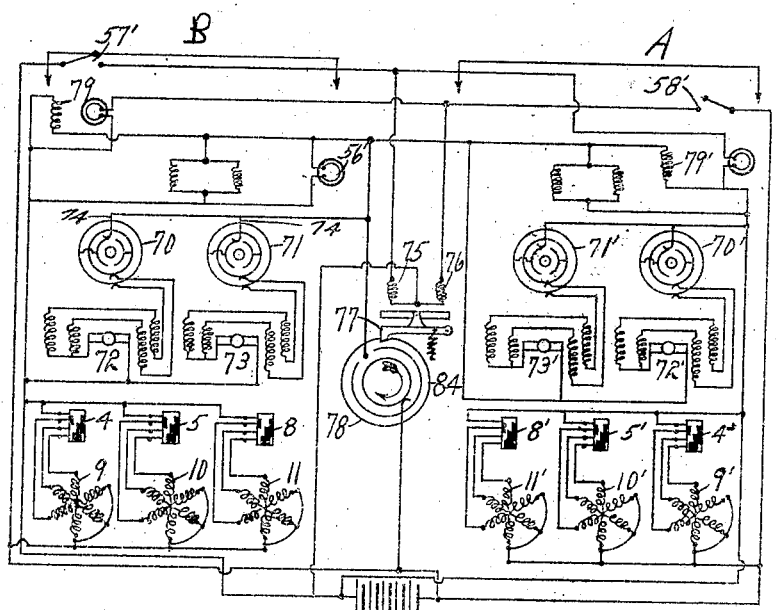
Fig. 8.
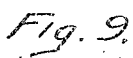
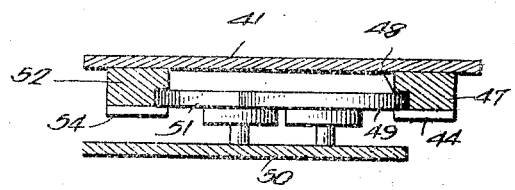
INVENTOR.
ELEMER MEITNER.
BY Herbert H. Thompson
ATTORNEY.

UNITED STATES PATENT OFFICE.

ELEMER MEITNER, OF BROOKLYN, NEW YORK, ASSIGNOR TO THE SPERRY GYROSCOPE COMPANY, OF BROOKLYN, NEW YORK, A CORPORATION OF NEW YORK.

RANGE-INDICATOR.

1,368,224.
Specification of Letters Patent.
Patented Feb. 8, 1921.

Application filed June 18, 1915. Serial No. 34,807.

*To all whom it may concern:*

Be it known that I, Dr. ELEMER MEITNER, a subject of the Emperor of Austria-Hungary, residing at Brooklyn, county of Kings, and State of New York, have invented certain new and useful Improvements in Range-Indicators, of which the following is a specification.

My invention relates to apparatus for indicating the range of a distant object. As is well known, the accuracy of such instruments is greatly increased by employing a long base line, that is by separating the two sighting instruments as far as possible. The usual method employed in these long base instruments is to transmit electrically the angle that each telescope makes with the base line to a central point where the readings are combined in some manner by which the range may be obtained.

The main object of this invention is to improve upon the method by which the angles are combined to obtain the range so that no calculations need be made by the operator. According to my invention, I provide an indicator which is automatically actuated from the two or more sighting instruments, and which so combines the indicated angular positions of said instruments as to furnish a ready indication of the range. I prefer also to provide the indicator with a mechanical computing device to show the range, which may or may not be set automatically from the readings of the angle functions.

Figure 5:
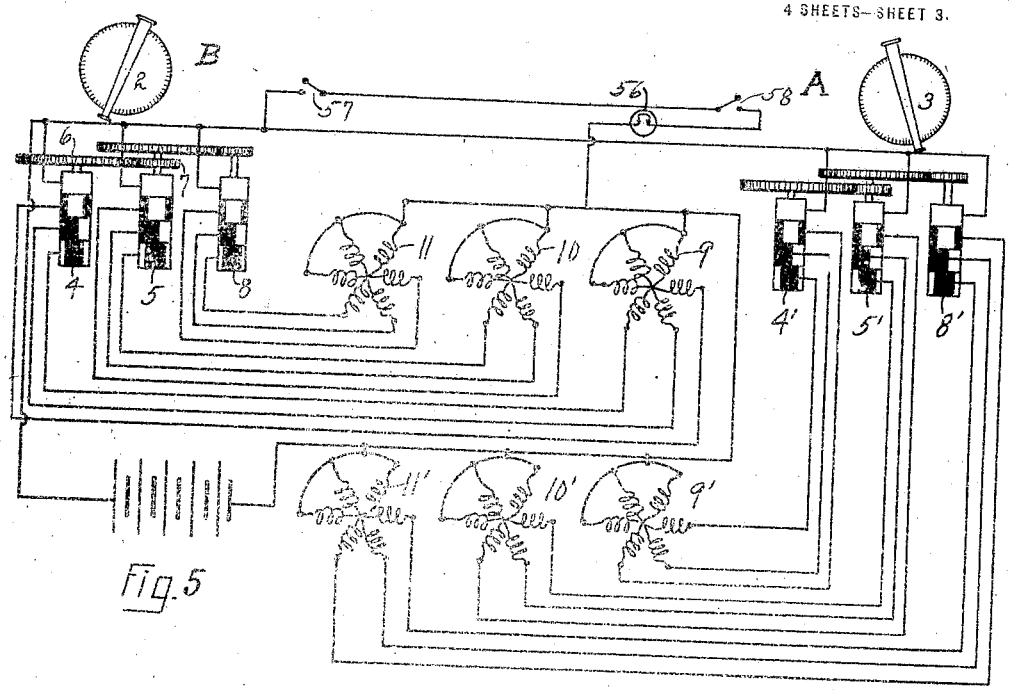
Figure 4:
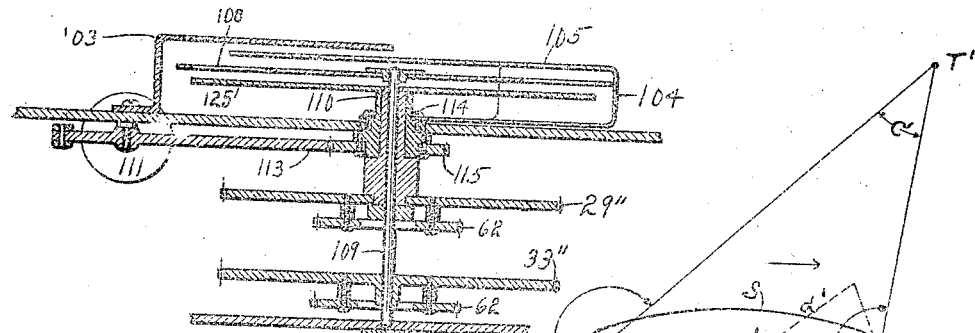
Figure 6:
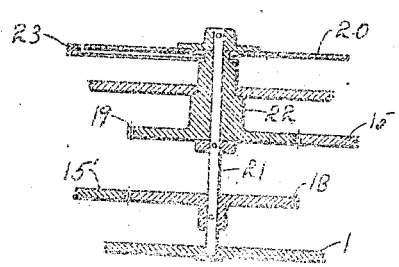

In the accompanying drawings, Figure 1 is a plan view, partly in section, of my complete range indicator. Fig. 2 is a vertical section of the same on line 2—2 of Fig. 1. Fig. 3 is a diagrammatic plan view of the modified form of one of the indicating dials. Fig. 4 is a vertical section of the same, taken on lines 4—4 of Fig. 3. Fig. 5 is a wiring diagram of the indicating and transmission instruments. Fig. 6 is a diagram showing the mathematical principles involved in my range finder. Fig. 7 is a vertical section on line 7—7 of Fig. 1. Fig. 8 is a wiring diagram of a modification. Fig. 9 is an enlarged detail view of a part of the mechanism illustrated in Fig. 2.

Taking up first the mathematical and general principles involved in my invention, reference is had to Figs. 5 and 6. The two sighting instruments A and B are so placed on the ship S as to give as long a base line $d$ as is practicable. With a target located at T it will at once be seen that $$\angle C = \angle A - \angle B.$$

An approximation of the true range is represented by $$\frac{R_1 + R_2}{2}$$

which we will call $R_0$. But $$\frac{R_1}{d} = \frac{\sin B}{\sin C}$$

and $$\frac{R_2}{d} = \frac{\sin A}{\sin C}$$

Hence $$R_0 = \frac{d}{\sin C} \cdot \frac{(\sin A + \sin B)}{2}$$

Writing this in a different form we have $$R_0 = \frac{d}{\sin C}\left(\sin \frac{A+B}{2} \cos \frac{A-B}{2}\right)$$

Also since $$\angle C = \angle A - \angle B,$$

we have $$R_0 = \frac{d}{\sin C}\left(\sin \frac{A+B}{2} \cos \frac{C}{2}\right)$$

In practice it is found that $C$ is always very small, never being greater than 8°. Hence $\sin C$ is approximately equal to the $\angle C$ and $$\cos \frac{C}{2}$$

approaches 1 as a limit. Making these approximations, we have $$R_0 = \frac{d}{C} \sin \frac{A+B}{2}$$

or $$R_0 = \frac{d}{A-B} \sin \frac{A+B}{2}$$

Upon examining the equation, it will be seen that neither the $$\angle A \text{ or } \angle B$$

need be transmitted to the indicator with any great degree of accuracy since the sine of an angle varies very slowly as it passes through 90°, but that the difference A—B must be known with great accuracy, if dependable results are to be secured.

Turning now to the mechanical embodiment of my invention illustrated in the accompanying drawings, 1 represents the casing within which are mounted a plurality of repeater motors adapted to be actuated from a plurality of transmitters on the two sighting instruments 2 and 3. According to my system, I make use of a plurality of transmitters adapted to transmit the angle in steps or increments. These transmitters may be set by hand from the readings of the sighting instrument or they may be mounted directly on the sighting instrument so as to be operated automatically thereby. Thus transmitter 4 may be directly connected to instrument 2 so that the steps transmitted will be large, while transmitter 5 may be geared up, as by gears 6 and 7, to transmit the angle or a portion thereof in much finer steps. A third transmitter 8, geared to even finer steps, may also be employed. While my invention is independent of the exact construction of the transmission system, I prefer to employ for reasons which will become apparent the system disclosed in the copending application of Harry L. Tanner, Ser. No. 32,254, electrical position indicator, filed June 5, 1915.

Repeater motors 9, 10 and 11 within casing 1 are actuated respectively by transmitters 4, 5 and 8, while motors 9', 10' and 11' are connected to transmitters 4', 5' and 8' on instrument 3. The two motors 9 and 9' are connected to dials 12, which are adapted to indicate the angular position (A and B) of each telescope within predetermined limits, for instance 5°. In Fig. 1 only one dial 12 is shown as the right hand half of the figure is broken away, so that the inner parts might be shown more clearly. The two halves are substantial duplicates. Motors 9 and 9' are also connected to a differential indicator 13, which is designed to indicate the value $$\frac{A+B}{2}.$$

A simple method for accomplishing both of these results is to gear the motors by pinions 14 mounted on the motor shafts to gears 15, 15' on the shafts of which pinions 16 are mounted. Pinions 16 mesh with large gears 17 which turn directly the dials 12. Also meshing with gear 15' is a gear 18, while a separate, but concentrically mounted gear 19 meshes with gear 15 (Fig. 7). A dial 20 is secured to the shaft 21 of gear 18, while the hollow hub 22 of gear 19 carries a pointer 23, readable upon said dial. It will be evident that said dial and pointer, if properly connected, will indicate the sum A+B, and that by graduating dial 20 so that each marking corresponds to double the markings of dials 12, that the said sum divided by two may be indicated. To further simplify the construction and reduce the size of indicator 13, I have shown it as indicating only the units between the tens of the mean angle $$\frac{A+B}{2},$$

dependence being had on dials 12 to show the correct second and third digits. Thus if A is 95° and B 91°, dial 13 would show simply 3, the operator taking the digit 9 from the dials 12.

Motors 10 and 10' are connected to one or more differential indicators 25, 26 designed to show the difference A—B. As before stated, the transmitters 5 and 5' connected with these motors transmit very small steps compared to transmitters 4, 4'. I prefer to design the indicators so that one complete revolution of the dial 27 is equal to the smallest subdivision on dial 12, or, in the example given, equal to 5° of arc. It should also be remarked that the magnitude of this arc is so chosen as to be equal to the maximum value of A—B that occurs in practice. By this means a very accurate reading is obtained, although only a small dial is employed. Motor 10 is connected to dial 27 through pinion 28 on the motor shaft and large gear 29 on the shaft 30 which carries adjacent its upper end dial 27. The reference index 31 is mounted on a sleeve 32 adjacent the lower end of which is mounted a gear 33. Similarly motor 10' is connected to dial 27' of indicator 26 through pinion 28', gear 29' and shaft 30'. Also reference index 31' is mounted on a sleeve 32' carrying gear 33'. Each index is driven from the opposite motor, so that a differential reading will be obtained. Thus gear 33' meshes with pinion 34', which is driven from gear 29 by being mounted on the same shaft as pinion 35' which meshes with gear 29, while gear 33 is similarly driven through pinion 34 from gear 29' (see Figs. 1 and 2).

It is obvious that the indicator 25 will only indicate correctly when the dial movement exceeds that of the index 31. Thus if the angle B is say 2° and the angle A is 1° the difference will be correctly indicated by indicator 25 as 1°. If, however, the angle B is 2° and the angle A is 3° the index 31 would pass over the zero of dial 27 and indicate 4° which is obviously incorrect. In short, if the angle B is greater than angle A the indicator 25 should be read. On the other hand if the angle A is greater than the angle B the movement of the dial 27' (which is moved in accordance with the magnitude of the angle A) will exceed that of index 31' so that the indicator 26 will indicate correctly. Calling attention to Fig. 6, in which the direction of travel of the ship S is indicated by the arrow, it will be seen that if the target T is dead ahead the angles A and B are both zero. If the target is to starboard the angle A is equal to angle B plus angle C or angle A is greater than B. If the target is dead astern the angles A and B are each equal to 180°. If the target is to port the angle B' is equal to the sum of the angles A' and C' or the angle B' is greater than the angle A'. It is, therefore, clear that if either of the angles A or B is less than 180°, which means that the target is to starboard, the indicator 26 should be read to obtain the correct difference. If either of the angles A or B is greater than 180°, which means that the target is to port, the indicator 25 should be read. The indicators 25 and 26 do not show the value of either of the angles A or B but by referring to the indicators 12 the operator may tell at a glance whether the angle A (or angle B) is greater or less than 180°, i. e. whether the target is to starboard or port and consequently which indicator 25 or 26 is to be read. For convenience each of the dials 12 may be labeled starboard on that side of the dial between 0° and 180° and port on the side between 180° and 360°. If either indicator 12 indicates starboard (less than 180°) the indicator 26 should be read to determine the difference A—B. If either indicator 12 indicates port the indicator 25 should be read.

Motors 11 and 11' may be connected to the differential indicators 36, 36' in precisely the same manner that motors 10 and 10' are connected to their indicators, so that a detailed explanation is unnecessary. Motor 11 actuates dial 37 and the index on the other indicator (not shown), while motor 11' actuates the dial on said indicator and index 38. Preferably indicators 36, 36' are designed so that one revolution equals the smallest subdivision on dials 25, 26, as for instance one-tenth of one degree or one minute. The dial may then be graduated in thousandths of degrees or in seconds.

Turning back to our equation, it will now be seen that we have all of the required data for the calculation of the range, since $d$ may be considered as fixed and known, for each ship. For quickly and accurately performing this calculation, I have devised a novel form of logarithmic scale, which I prefer to make a part of the indicator. A logarithmic scale 40 graduated in units of length, such as yards, is clamped to the interior of the case 1. The scale is preferably graduated in a spiral, so that a maximum variation in range may be indicated on a circular scale. Within scale 40 is rotatably mounted an annulus 41 which carries two distinct scales, one of which, 42, coöperates with a fixed index or reference line 66 and is graduated in degrees to represent the mean angle $$\frac{A+B}{2},$$

but which is laid out according to the log.

$$\sin\frac{A+B}{2},$$

while the other, 43, is graduated preferably in thousandths of degrees to represent log $(A-B)$. While I am aware that the scale 43 might be graduated in a spiral similarly to scale 40, so that when the first convolution of scale 43 were used, the first convolution of scale 40 would be read in connection therewith, I prefer to show the said scale as circular. Annulus 41 is provided on its under surface with an annular guide 47 on which gear teeth 44 are cut, with which a gear 45 meshes. While I am aware that the gear 45 might be driven automatically I have, for the sake of simplicity, shown this gear driven by the handle 46 mounted on the shaft of said gear. Guide 47 is also provided with a groove 48 which takes over rollers 49 mounted on brackets 50 extending from case 1 (see Fig. 9). Concentric with guide 47 is rotatably mounted by similar rollers 51 a ring 52 which carries an index 53 (Fig. 1) readable on both scales 40 and 43. Ring 52 is also provided with gear teeth 54 by means of which index 53 may be adjusted. I prefer to set said index by hand, as by means of handle 55 similar in operation to handle 46, since much complication is avoided by employing hand-setting instead of automatic-setting means.

The indicator may also be provided with a signaling means so that the observer may know when readings should be taken, that is when both sighting devices are on the target. This signal is preferably a lamp 56 connected so as to be lighted only when buttons 57 and 58 on the two telescopes are both closed. The buttons 57 and 58 may be manually operated.

In order to synchronize the various dials with their respective repeaters, I employ spring-pressed handles 60, which, on being pushed in, engage crown gears 61 mounted on their shafts with gears 62 connected preferably to the gears serving to drive the dials in question.

Instead of employing two sets of indicators 25, 26 or 36 to subtract B from A and A from B, I may employ a single indicator in each instance, such as shown in Figs. 3 and 4. This comprises a single dial 125 provided with two sets of circular graduations 101 and 102, which are numbered in opposite directions, and each of which comprises duplicate semi-circular scales. A fixed cover 103 shown in dotted lines in Fig. 3 covers half of the dial. Underneath said cover is a rotatable shield 104, one half of the top of which is of short radius so as to expose graduations 101 while the other half is longer but is provided with a semi-circular slot 105, so that graduations 101 are covered but 102 are exposed. Movable pointers 106 and 107 are provided for each scale. Preferably they are mounted on the same member 108 and are in duplicate as shown, since each half of the dial 125 indicates a complete digit, unlike dials 27, 28. Member 108 is mounted on a stem 109 and driven by gear 33'' from a repeater motor, and dial 125 may be mounted on a sleeve 110 driven by gear 29'' from a second repeater motor, neither motor being shown. Automatic means may be provided to turn shield 104 through 180° when the angles A and B change from starboard to port and vice versa. This means may comprise a solenoid 111, the armature 112 of which is linked to a pivoted gear sector 113. The sleeve 114 which carries sector 104 is also provided with a gear 115 which meshes with said sector 113. A contact 116 located either on the indicator 1 or on either sighting instrument is provided to actuate said solenoid, thereby pulling the sector against the action of spring 117 and causing the starboard indications to become visible.

The operation of the indicator as a whole is very simple. All that the observer need do is to set scale 42 with reference to the index 66 so as to indicate the mean angle $$\frac{A+B}{2}$$

as shown on dial 13, and then set pointer 53 to indicate angle A—B as shown in either dials 25, 36 if indicators 12 show port, or dials 26, 36' if said indicators show starboard. Scale 40 will then show the correct range. Of course if the base line $d$ is changed, the instrument must be readjusted. All that need be done, however, is to shift the position of either scale 40 or of zero index 66. It is also of interest to note in our fundamental equation that $$d \sin \frac{A+B}{2}$$

really represents approximately the length of an imaginary base line $d'$, so that the shifting of annulus 41 represents changing our effective base line.

As stated above, I prefer to actuate my range indicator from sending instruments which contain at least certain features shown in said application of Harry L. Tanner. Figs. 1 to 5 inclusive of said Tanner application are identical (except for a difference in reference numerals) to Figs. 6 to 10 respectively of the British patent to Gillmor No. 11,665 of 1915. The remaining figure of said Tanner application is practically identical to Fig. 11 of said British patent and to Fig. 8 of the present application. Reference may be had to the said British patent for a more complete disclosure of the details of the transmission system *per se*. The general combination is indicated in Fig. 8. According to this method, transmitter 4 is directly connected with the sighting instrument B, as before. Transmitters 5 and 8 are not so connected, however, but are normally disconnected therefrom. For governing the transmitters, an electrical follow-up system is employed. Rotary reversing contacts 70 and 71 are connected to the instrument by step-up gearing similar to that indicated in connection with transmitters 5 and 8 in Fig. 5. Reversible motors 72 and 73 are in circuit with said contacts and have a follow-up connection with the brushes 74, the transmitters 5 and 8 being driven by the motors. Also in circuit with said contacts and motors is a circuit closing device 84 adapted to render said contacts and motors operative for a predetermined period of time at certain intervals. Said device 84 is governed by a pair of electro-magnets 75, 76, each of which is in circuit with a switch 57' (58') on one of the sending instruments. When both of switches 57' 58' are closed, then and only then is a catch 77 on device 84 released, which allows drum 78 to rotate through at least one revolution, thus closing the motor circuits during this period. The length of this period is so adjusted as to give the transmission mechanism ample time to transmit the indications, during which time the sighting instruments are locked by electro-magnetic means 79, 79'. According to this system the lamp 56' is placed in the same circuit with device 84, so that it is not only lighted when both switches 57' and 58' are closed, but remains lighted while the angles are being transmitted. Preferably the dials and indices on indicators 25, 26, 36 and 36' are so connected with the repeater motors that they maintain the same angular position with respect to their respective follow-up brushes 74 on contacts 70, 71, 70' and 71'. With this system the advantages of a direct gear connection of the transmitters with the sighting instruments and the advantages of a separate hand-setting means are combined, since the repeater motors which reproduce the smaller increments of the angles are only rotated through a comparatively small number of revolutions at a uniform speed, as may be done with a hand-setting means for each transmitter, and since the rotation is secured automatically, without the necessity for manual setting.

The action of the indicator when operated from this form of transmission mechanism can be best illustrated by a concrete example. Suppose the angle A=93.685° and ∠B= 90.428°. Dials 12, being driven by motors 9 and 9′, would then both indicate 90°+. As the sighting instruments were being adjusted contacts 70, 71, 70′ and 71′ were, of course, revolved at high speed, but indicators 25, 26, 36, and 36′ would remain unaffected until both instruments had come to rest on the target. Each contact would then be at a definite angle to its zero position. Upon closing of the circuit through the follow-up motors, brushes 74 would be brought to the same angular position as the contacts by the shortest path and at the same time the dials would also be brought to a similar position through the transmitters and repeater motors. In the example given dial 27′ would be turned so as to read 3.6° with reference to a fixed index or since it follows the shortest path it would be turned backward through 5—3.6 divisions or 1.4 divisions. Similarly dial 27 would be turned through .4 of a division. At the same time the index 31 would be turned backward 1.4 divisions and index 31′ forward through .4 divisions, so that indicator 26 would read 3.2° and indicator 25, 1.8°. But since A and B are less than 180°, only indicator 26 would be read. Similarly indicator 36′ would read 57 thousandths (.085—.028) and indicator 36 would read 43 thousandths, of which readings the former only would be used. Indicator 13 would read about 2, the digit 9 being taken from indicators 12, as explained above.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a range finder, the combination with a pair of separated sighting instruments and transmission mechanism for each, of an indicator including a plurality of repeater motors, at least one of which is actuated from each of said mechanisms, and coöperating means actuated from each motor for indicating the angle subtended by the target.

2. In a range finder, the combination with a pair of separated sighting instruments and transmission mechanism for each, of an indicator including a plurality of repeater motors, at least one of which is actuated from each of said mechanisms, coöperating indicating means actuated from each motor for showing the mean angle made by the sighting instruments with the base line, and means for indicating the difference between the angles made by the sighting instruments and the base line.

3. In a range finder, the combination with a pair of separated sighting instruments and a transmitter for each, of an indicator including a repeater motor actuated from each transmitter, an angle indicating device connected with each motor for indicating only the increment of the observed angle within predetermined limits, said devices being so located as to show the difference between the observed angles.

4. In a range finder, the combination with a pair of separated sighting instruments and transmission mechanism for each, of an indicator including a plurality of repeater motors, at least one of which is actuated from each of said mechanisms, coöperating means actuated from each motor for indicating the angle subtended by the target, and means for determining the range corresponding to said angle.

5. In a range finder, an indicator adapted to subtract the after from the forward target bearing angle, a second indicator adapted to subtract the forward from the after target bearing angle, and means for indicating which of said indicators should be read governed by the magnitude of said angles.

6. In a range finder, a repeater motor adapted to be actuated from a master target bearing indicator, a second repeater motor adapted to be actuated from another master indicator, an angle indicating dial connected with each motor, and a movable index for each dial connected with the motor of the other dial.

7. In combination a transmitting instrument for transmitting the bearing of a target with reference to a certain point, a second transmitting instrument for transmitting the bearing of the target with reference to a point spaced from said first mentioned point, receiving means connected to each of said transmitting instruments and means operatively connected to both of said receiving means for indicating the difference between said bearings.

8. In combination a transmitting instrument for transmitting the bearing of a target with reference to a certain point, a second transmitting instrument for transmitting the bearing of the target with reference to a point spaced from said first mentioned point, receiving means connected to each of said transmitting instruments, means operatively connected to both of said receiving means for indicating the difference of said bearings and means operatively connected to said receiving instruments for indicating the mean of said bearings.

9. In a range finder, in combination, a pair of spaced sighting instruments, two transmitters, one for each of said sighting instruments, a repeater motor connected to each of said transmitters, an indicator connected with each repeater motor adapted to indicate the observed angle, additional transmitters, one for each sighting instrument, a repeater motor connected to each of said last mentioned transmitters and an indicator connected to each of said last mentioned repeater motors, one of said last mentioned indicators being adapted to indicate one of the observed angles minus a certain value and the other indicator, the other of said observed angles minus the same value.

10. In a range finder, in combination, a pair of spaced sighting instruments, a transmitter for each instrument, a repeater motor connected to each transmitter, an angle indicating device connected with each motor adapted to indicate only the increment of the observed angle within predetermined limits, said device being so located as to show the difference between the observed angles, additional transmitters, one for each of said sighting instruments and an indicator connected with each of said last named transmitters, each of said last named indicators being adapted to indicate a corresponding observed angle.

11. In a range finder, in combination, a pair of spaced sighting instruments, a transmitter for each of said instruments, a repeater motor connected to each of said transmitters, indicating means connected to both of said motors adapted to indicate the mean of the observed angles, additional transmitters, one for each of said sighting instruments, a repeater motor connected to each of said last named transmitters and an indicator connected to each of the last named motors for indicating only the increment of the corresponding observed angle, said last named indicators being so positioned as to show the whole of the difference between the observed angles.

In testimony whereof, I have signed my name to this specification this 15th day of June, 1915.

Dr. ELEMER MEITNER.